(No Model.)
J. W. DAVY.
LIGHT TOWER.
No. 406,432. Patented July 9, 1889.
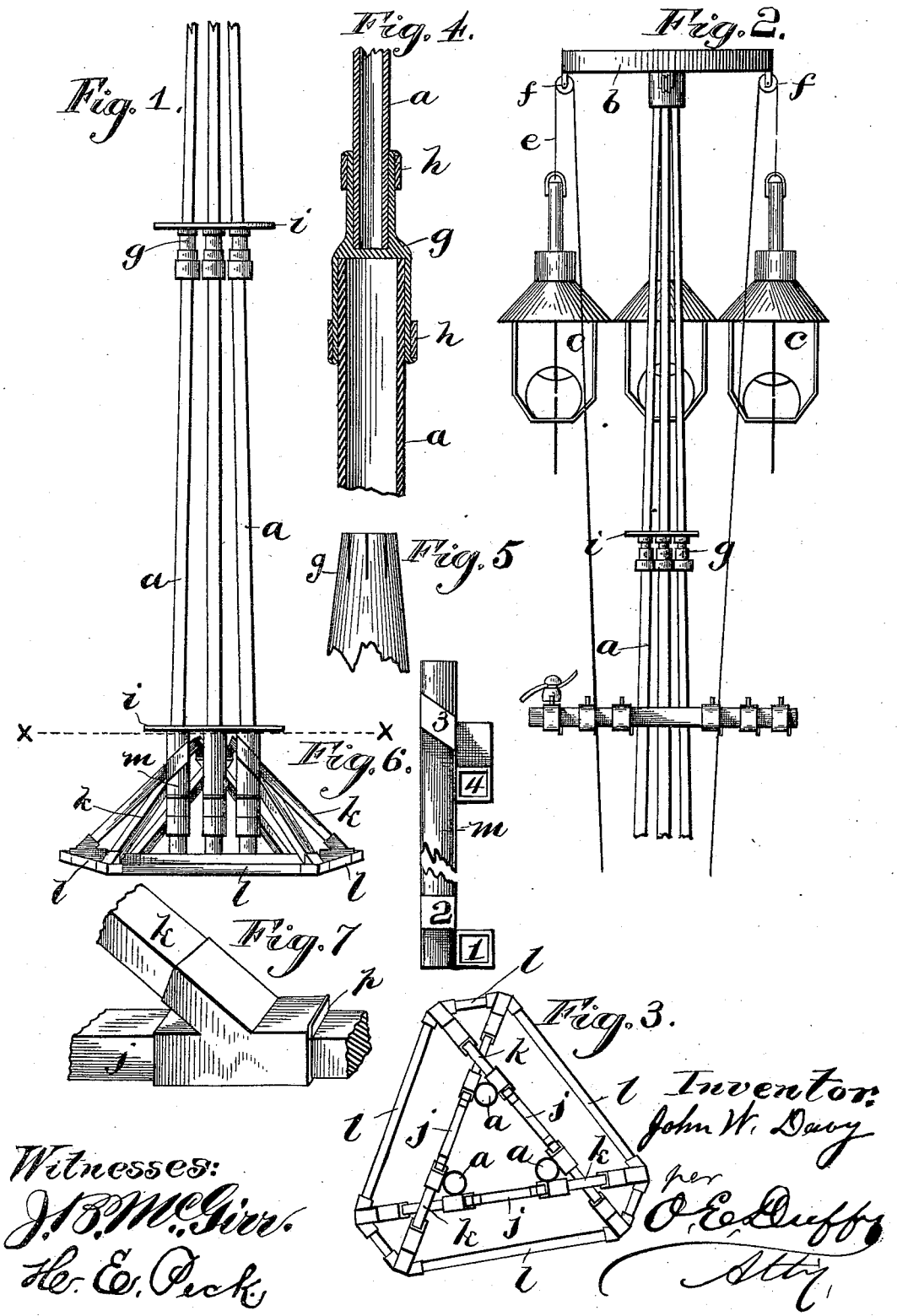

UNITED STATES PATENT OFFICE.

JOHN W. DAVY, OF KINGSTON, ONTARIO, CANADA.

LIGHT-TOWER.

SPECIFICATION forming part of Letters Patent No. 406,432, dated July 9, 1889.

Application filed September 7, 1888. Serial No. 284,788. (No model.)

*To all whom it may concern:*

Be it known that I, JOHN W. DAVY, of Kingston, in the Province of Ontario and Dominion of Canada, have invented certain new and useful Improvements in Light-Towers; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to improvements in poles or towers especially adapted for lighting purposes.

The object of the invention is to produce a tower which can be more readily and rigidly anchored or fixed in position, and yet will be simpler and cheaper in construction than the devices of this class heretofore in use, and also to produce a tower the uprights of which are formed in sections removably clamped together by an improved joint.

The invention consists in certain novel features of construction and combination of parts, more fully described hereinafter, and particularly pointed out in the claims.

Referring to the accompanying drawings, Figure 1 is an elevation of the tower and its base, the upper portion or crown of the tower being broken away. Fig. 2 is an elevation of the upper portion or crown of the tower. Fig. 3 is a section on line $x$ $x$, Fig. 1, looking down. Fig. 4 is a detail longitudinal section of a joint between two upright sections. Fig. 5 is a detail view of one of the ends of a connecting link or sleeve. Figs. 6 and 7 are details of the sleeves and sockets by means of which the base is secured together.

The tower is preferably, as shown, triangular in cross-section and composed of three or more tubular uprights $a$, formed in corresponding sections removably joined together to form an upwardly-tapering tower provided at its top with a suitable crown $b$, preferably circular in form, and from which the lamps or lights $c$, provided with suitable reflectors, are suspended by means of cables or ropes $e$, operating over and supported by pulleys $f$, carried by the crown. Each cable carries a lamp and passes over a pulley $f$, and from thence extends downwardly to or near the ground, where they can be suitably fastened and by which the lamps can be raised or lowered and held at the desired position. The sections composing the uprights $a$ are joined together by means of connecting links or sleeves $g$, having corresponding sockets in their upper and lower ends, and the ends of the sleeves are beveled outwardly and split or slit longitudinally, as clearly shown.

When the parts are joined together, the upper end of a lower upright section fits tightly into the lower socket of a sleeve $g$, and the lower end of the next section above fits in the upper socket of the sleeve. The ends of the sections are tightly clamped in the sockets and together by rings $h$, driven upon the beveled ends of the sleeves, thereby contracting the split ends and firmly clamping them against the upright sections, and after the rings are driven as far upon the sleeves as possible the split ends are bent outwardly to hold the rings in position, as clearly shown in Fig. 4, thus forming an exceedingly strong, durable, and firm joint, which is elastic and detachable.

The corresponding sections of the different uprights are preferably the same length, and are hence interchangeable, thus bringing the joints between each corresponding set of sections and the next set in the same horizontal plane, as shown, and each set of sleeves are secured together, and the tower thoroughly braced and strengthened by cross-pieces or braces $i$.

At its lower end the tower is provided with an anchor adapted to be buried a suitable distance below the surface of the ground, and consisting, in the present case, of three horizontal supporting-beams $j$, each beam being secured to two uprights, and extending laterally a suitable distance beyond the tower and crossing each other, as shown. Each horizontal beam is further secured to the uprights, which it connects by inclined braces $k$, extending from the beam upwardly to the uprights, and the outer free ends of the horizontal beams are secured together by cross-bars $l$. The various corresponding parts of the anchor are interchangeable and removably clamped together and to the uprights by sleeves, sockets, and wedges. To the lower end of each upright a sleeve m is suitably secured, and each of said sleeves is provided at its upper portion with inclined sockets 3 4, in which the upper ends of a pair of braces k are clamped by wedges p or other means, and at their lower portions each sleeve is provided with a pair of transverse sockets 1 2, through which the horizontal beams pass and in which they are secured by wedges. The outer ends of the horizontal beams are provided with sleeves having sockets, in which the ends of the cross-bars are clamped.

It will thus be seen that the lower ends of the uprights are secured to the anchor by durable yet elastic joints, and that an anchor or base is formed possessing great strength and durability, and composed of a minimum number of removable interchangeable parts.

If desired, the tower can be provided with one or more cross-pieces to support telegraph-wires, as shown.

It is not considered necessary to fully enumerate the great advantage and utility of the herein-described tower, as the same will be fully evident and obvious to all persons.

It is evident that various changes and modifications might be made in the form and arrangement of the parts described without departing from the spirit and scope of my invention; hence I do not wish to limit myself to the precise construction herein set forth, but consider myself entitled to all such changes.

I claim—

1. A base or anchor for a pole or tower, comprising main horizontal beams secured to the lower end of the pole or tower, cross-bars connecting the outer ends of the horizontal beams, and inclined braces secured to the beams and pole or tower, substantially as set forth.

2. The herein-described joint, comprising a sleeve or connecting-link provided with sockets at its opposite ends to snugly receive the parts to be joined, the ends of the link being split and tapered outwardly, and one or more rings to be driven on each end of the link and thereby contract the sockets and by friction clamp said parts in the same, whereby the use of screw-threads is avoided, substantially as described.

3. A tower comprising uprights formed in sections, connecting-links having tapered split ends surrounding sockets in which the upright sections are located, one or more rings forced upon the tapered split ends, thereby contracting the sockets and by friction clamping the upright sections therein, the split ends being "upset" upon the rings, and cross-pieces securing each set of connecting-links together, substantially as set forth.

In testimony that I claim the foregoing as my own I affix my signature in presence of two witnesses.

J. W. DAVY.

Witnesses:
JOHN McINTYRE,
D. A. GIVENS.